US012452619B2

(12) United States Patent
Laitinen et al.

(10) Patent No.: US 12,452,619 B2
(45) Date of Patent: Oct. 21, 2025

(54) SPATIAL AUDIO REPRESENTATION AND RENDERING

(71) Applicant: Nokia Technologies Oy, Espoo (FI)

(72) Inventors: Mikko-Ville Laitinen, Espoo (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 226 days.

(21) Appl. No.: 17/927,418

(22) PCT Filed: May 7, 2021

(86) PCT No.: PCT/FI2021/050339
§ 371 (c)(1),
(2) Date: Nov. 23, 2022

(87) PCT Pub. No.: WO2021/240053
PCT Pub. Date: Dec. 2, 2021

(65) Prior Publication Data
US 2023/0199417 A1 Jun. 22, 2023

(30) Foreign Application Priority Data
May 27, 2020 (GB) ..................................... 2007904

(51) Int. Cl.
*H04S 7/00* (2006.01)
*G10L 19/008* (2013.01)

(52) U.S. Cl.
CPC .............. *H04S 7/30* (2013.01); *G10L 19/008* (2013.01); *H04S 2400/11* (2013.01); (Continued)

(58) Field of Classification Search
CPC .... H04S 7/30; H04S 2400/11; H04S 2400/15; H04S 2420/01; H04S 2420/03; H04S 2420/11; G10L 19/008
(Continued)

(56) References Cited

U.S. PATENT DOCUMENTS

2010/0094631 A1* 4/2010 Engdegard ............ G10L 19/008 704/258
2016/0373877 A1 12/2016 Laitinen ............................ 7/304

FOREIGN PATENT DOCUMENTS

EP 2830048 A1 1/2015
JP 2010525403 A 7/2010
(Continued)

OTHER PUBLICATIONS

Vilkamo, Juha et al., "Optimized Covariance Domain Framework for Time-Frequency Processing of Spatial Audio," J. Audio Eng. Soc., vol. 61, No. 6, Jun. 2013.

*Primary Examiner* — Vivian C Chin
*Assistant Examiner* — Douglas J Suthers
(74) *Attorney, Agent, or Firm* — McCarter & English, LLP

(57) ABSTRACT

An apparatus including circuitry configured to: receive a spatial audio signal, the spatial audio signal including at least one audio signal and spatial metadata associated; generate at least one decorrelated audio signal; determine at least one control parameter, wherein the at least one control parameter is at least based on at least one target further property of the at least two output audio signals and at least one of: the spatial metadata and at least one property determined based on the at least one audio signal; and generate the at least two output audio signals based on the spatial audio signal and at least one decorrelated audio signal, wherein the amount of the at least one decorrelated audio signal within at least two output audio signals is controlled based on the at least one control parameter.

20 Claims, 7 Drawing Sheets

(52) U.S. Cl.
CPC ....... *H04S 2400/15* (2013.01); *H04S 2420/01* (2013.01); *H04S 2420/03* (2013.01); *H04S 2420/11* (2013.01)

(58) Field of Classification Search
USPC .......................................................... 381/303
See application file for complete search history.

(56) References Cited

FOREIGN PATENT DOCUMENTS

| | | | |
|---|---|---|---|
| JP | 2011530913 | A | 12/2011 |
| JP | 2016530803 | A | 9/2016 |
| JP | 2021525392 | A | 9/2021 |
| WO | WO-2015/017235 | A1 | 2/2015 |

* cited by examiner

SPATIAL AUDIO REPRESENTATION AND RENDERING

CROSS REFERENCE TO RELATED APPLICATION

This patent application is a U.S. National Stage application of International Patent Application Number PCT/FI2021/050339 filed May 7, 2020, which is hereby incorporated by reference in its entirety, and claims priority to GB 2007904.2 filed May 27, 2020.

FIELD

The present application relates to apparatus and methods for spatial audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Input signals can be presented to the IVAS encoder in one of a number of supported formats (and in some allowed combinations of the formats). For example a mono audio signal (without metadata) may be encoded using an Enhanced Voice Service (EVS) encoder. Other input formats may utilize new IVAS encoding tools. One input format proposed for IVAS is the Metadata-assisted spatial audio (MASA) format, where the encoder may utilize, e.g., a combination of mono and stereo encoding tools and metadata encoding tools for efficient transmission of the format. MASA is a parametric spatial audio format suitable for spatial audio processing. Parametric spatial audio processing is a field of audio signal processing where the spatial aspect of the sound (or sound scene) is described using a set of parameters. For example, in parametric spatial audio capture from microphone arrays, it is a typical and an effective choice to estimate from the microphone array signals a set of parameters such as directions of the sound in frequency bands, and the relative energies of the directional and non-directional parts of the captured sound in frequency bands, expressed for example as a direct-to-total ratio or an ambient-to-total energy ratio in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

For example, there can be two channels (stereo) of audio signals and spatial metadata. The spatial metadata may furthermore define parameters such as: Direction index, describing a direction of arrival of the sound at a time-frequency parameter interval; level/phase differences; Direct-to-total energy ratio, describing an energy ratio for the direction index; Diffuseness; Coherences such as Spread coherence describing a spread of energy for the direction index; Diffuse-to-total energy ratio, describing an energy ratio of non-directional sound over surrounding directions; Surround coherence describing a coherence of the non-directional sound over the surrounding directions; Remainder-to-total energy ratio, describing an energy ratio of the remainder (such as microphone noise) sound energy to fulfil requirement that sum of energy ratios is 1; Distance, describing a distance of the sound originating from the direction index in meters on a logarithmic scale; covariance matrices related to a multi-channel loudspeaker signal, or any data related to these covariance matrices; other parameters guiding a specific decoder, e.g., centre prediction coefficients and one-to-two decoding coefficients (used, e.g., in MPEG Surround). Any of these parameters can be determined in frequency bands.

The rendering of a parametric spatial audio (i.e., audio signal(s) and associated spatial metadata, e.g., a MASA stream) to a binaural (or any other) output is known. The typical situation is one where there are two audio channel signals in the stream along with the metadata. There may be 1 or 2 (or more) directions for each time-frequency interval in the metadata.

Vilkamo, J., Bäckström, T. and Kuntz, A., 2013. Optimized covariance domain framework for time-frequency processing of spatial audio. Journal of the Audio Engineering Society, 61(6), pp. 403-411 presented one particularly suitable method for spatial audio rendering, where the covariance matrix of the input signals is estimated in frequency bands, and a target covariance matrix for the output signals is determined based on the spatial metadata. Based on these matrices, a least-squares optimized mixing matrix is determined in frequency bands which, when applied to the audio signals, produces output signals that have the desired target covariance matrix properties. Moreover, if the target covariance matrix requires more incoherent signals components than available in the input signals, the input signals can be further decorrelated and processed to obtain a "residual signal" which, when mixed to the output signals, provides the required incoherence at the output.

SUMMARY

There is provided according to a first aspect an apparatus comprising means configured to: receive a spatial audio signal, the spatial audio signal comprising at least one audio signal and spatial metadata associated with the at least one audio signal; generate at least one decorrelated audio signal based on the at least one audio signal; determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

The at least one control parameter may comprise at least one of: at least one processing gain applied to at least one of the at least one decorrelated audio signal or the at least one audio signal being decorrelated; at least one mixing matrix configured to control a mixing of the at least one decorrelated audio signal and the at least one audio signal; at least one mixing matrix and at least one residual mixing matrix, the at least one mixing matrix and the at least one residual mixing matrix configured to control a mixing of the at least one decorrelated audio signal and the at least one audio signal; and at least one covariance matrix configured to control a generation of at least one mixing matrix and/or at least one residual mixing matrix, the at least one mixing matrix and/or the at least one residual mixing matrix configured to control a mixing of the at least one decorrelated audio signal and/or the at least one audio signal.

The means configured to determine at least one control parameter configured to control an amount of the at least one decorrelated audio signal within at least two output audio signals for spatial audio reproduction may be further configured to: determine at least one at least one further property based on the at least one audio signal; determine the at least one target further property of the at least two output audio signals; determine at least one first control parameter based on the at least one further property based on the at least one audio signal and the at least one target further property of the at least two output audio signals; and determine at least one second control parameter or modify the at least one first control parameter based on at least one of: the spatial metadata and the at least one property determined based on the at least one audio signal.

The means configured to generate the at least two output audio signals for spatial audio reproduction may be further configured to mix the at least one audio signal and at least one decorrelated audio signal based on the at least one first control parameter and at least one second control parameter or the at least one modified first control parameter.

The means may be further configured to output the at least two output audio signals for spatial audio reproduction.

The means may be configured to determine the at least one second control parameter or the modified at least one first control parameter based on at least one direct-to-total energy ratio parameter within the spatial metadata.

The at least one further property based on the at least one audio signal may be a covariance, and the at least one target further property of the at least two output audio signals may be a target covariance of the at least two output audio signals. The means configured to determine at least one second control parameter or modify the at least one first control parameter may be configured to: determine a residual covariance property based on the covariance property and the target covariance property of the at least two output audio signals; process the residual covariance property based on the spatial metadata associated with the at least one audio signal.

The means configured to process the residual covariance property based on the spatial metadata associated with the at least one audio signal may be configured to: attenuate the residual covariance property when the spatial metadata indicates that the at least one audio signal is highly directional; and pass the residual covariance property unprocessed when the spatial metadata indicates that the at least one audio signal is fully ambient.

The means configured to determine a target covariance of the at least two output audio signals may be further configured to: generate an overall energy estimate based on the covariance property; determine head related transfer function data based on a direction parameter from the metadata associated with the at least one audio signal; and determine the target covariance property of the at least two output audio signals further based on the head related transfer function data and the overall energy estimate.

The means may be configured to determine the at least one property based on the at least one audio signal, wherein the at least one property is an audio type, and the means configured to determine at least one control parameter configured to control an amount of the at least one decorrelated audio signal within at least two output audio signals for spatial audio reproduction may be further configured to: determine whether the audio type is a determined audio type; and determine the at least one control parameter based on the audio type is the determined audio type.

The determined audio type may be speech.

The at least one audio signal may comprise transport audio signals generated by an encoder.

According to a second aspect there is provided a method comprising: receiving a spatial audio signal, the spatial audio signal comprising at least one audio signal and spatial metadata associated with the at least one audio signal; generating at least one decorrelated audio signal based on the at least one audio signal; determining at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generating the at least two output audio signals for spatial audio reproduction based on the spatial audio signal and at least one decorrelated audio signal, wherein the amount of the at least one decorrelated audio signal within at least two output audio signals is controlled based on the at least one control parameter.

The at least one control parameter may comprise at least one of: at least one processing gain applied to at least one of the at least one decorrelated audio signal or the at least one audio signal being decorrelated; at least one mixing matrix configured to control a mixing of the at least one decorrelated audio signal and the at least one audio signal; at least one mixing matrix and at least one residual mixing matrix, the at least one mixing matrix and the at least one residual mixing matrix configured to control a mixing of the at least one decorrelated audio signal and the at least one audio signal; and at least one covariance matrix configured to control a generation of at least one mixing matrix and/or at least one residual mixing matrix, the at least one mixing matrix and/or the at least one residual mixing matrix configured to control a mixing of the at least one decorrelated audio signal and/or the at least one audio signal.

Determining at least one control parameter configured to control an amount of the at least one decorrelated audio signal within at least two output audio signals for spatial audio reproduction may further comprise: determining at least one at least one further property based on the at least one audio signal; determining the at least one target further property of the at least two output audio signals; determining at least one first control parameter based on the at least one further property based on the at least one audio signal and the at least one target further property of the at least two output audio signals; and determining at least one second control parameter or modifying the at least one first control parameter based on at least one of: the spatial metadata and the at least one property determined based on the at least one audio signal.

Generating the at least two output audio signals for spatial audio reproduction may further comprise mixing the at least one audio signal and at least one decorrelated audio signal based on the at least one first control parameter and at least one second control parameter or the at least one modified first control parameter.

The method may further comprise outputting the at least two output audio signals for spatial audio reproduction.

The method may further comprise determining the at least one second control parameter or the modified at least one first control parameter based on at least one direct-to-total energy ratio parameter within the spatial metadata.

The at least one further property based on the at least one audio signal may be a covariance property, and the at least one target further property of the at least two output audio signals may be a target covariance property of the at least two output audio signals.

Determining at least one second control parameter or modifying the at least one first control parameter may comprise: determining a residual covariance property based on the covariance property and the target covariance property of the at least two output audio signals; and processing the residual covariance property based on the spatial metadata associated with the at least one audio signal.

Processing the residual covariance property based on the spatial metadata associated with the at least one audio signal may comprise: attenuating the residual covariance property when the spatial metadata indicates that the at least one audio signal is highly directional; and passing the residual covariance property unprocessed when the spatial metadata indicates that the at least one audio signal is fully ambient.

Determining a target covariance property of the at least two output audio signals may further comprise: generating an overall energy estimate based on the covariance property; determining head related transfer function data based on a direction parameter from the metadata associated with the at least one audio signal; and determining the target covariance property of the at least two output audio signals further based on the head related transfer function data and the overall energy estimate.

The method may further comprise determining the at least one property based on the at least one audio signal, wherein the at least one property is an audio type, and determining at least one control parameter configured to control an amount of the at least one decorrelated audio signal within at least two output audio signals for spatial audio reproduction may further comprise: determining whether the audio type is a determined audio type; and determining the at least one control parameter based on the audio type is the determined audio type.

The determined audio type may be speech.

The at least one audio signal may comprise transport audio signals generated by an encoder.

According to a third aspect there is provided an apparatus comprising at least one processor and at least one memory including a computer program code, the at least one memory and the computer program code configured to, with the at least one processor, cause the apparatus at least to: receive a spatial audio signal, the spatial audio signal comprising at least one audio signal and spatial metadata associated with the at least one audio signal; generate at least one decorrelated audio signal based on the at least one audio signal; determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

The at least one control parameter may comprise at least one of: at least one processing gain applied to at least one of the at least one decorrelated audio signal or the at least one audio signal being decorrelated; at least one mixing matrix configured to control a mixing of the at least one decorrelated audio signal and the at least one audio signal; at least one mixing matrix and at least one residual mixing matrix, the at least one mixing matrix and the at least one residual mixing matrix configured to control a mixing of the at least one decorrelated audio signal and the at least one audio signal; and at least one covariance matrix configured to control a generation of at least one mixing matrix and/or at least one residual mixing matrix, the at least one mixing matrix and/or the at least one residual mixing matrix configured to control a mixing of the at least one decorrelated audio signal and/or the at least one audio signal.

The apparatus caused to determine at least one control parameter configured to control an amount of the at least one decorrelated audio signal within at least two output audio signals for spatial audio reproduction may be further caused to: determine at least one at least one further property based on the at least one audio signal; determine the at least one target further property of the at least two output audio signals; determine at least one first control parameter based on the at least one further property based on the at least one audio signal and the at least one target further property of the at least two output audio signals; and determine at least one second control parameter or modify the at least one first control parameter based on at least one of: the spatial metadata and the at least one property determined based on the at least one audio signal.

The apparatus caused to generate the at least two output audio signals for spatial audio reproduction may be further caused to mix the at least one audio signal and at least one decorrelated audio signal based on the at least one first control parameter and at least one second control parameter or the at least one modified first control parameter.

The apparatus may be further caused to output the at least two output audio signals for spatial audio reproduction.

The apparatus may be further caused to determine the at least one second control parameter or the modified at least one first control parameter based on at least one direct-to-total energy ratio parameter within the spatial metadata.

The at least one further property based on the at least one audio signal may be a covariance property, and the at least one target further property of the at least two output audio signals may be a target covariance property of the at least two output audio signals.

The apparatus caused to determine at least one second control parameter or modify the at least one first control parameter may be caused to: determine a residual covariance property based on the at least one first control parameter and the target covariance property of the at least two output audio signals; and process the residual covariance property based on the spatial metadata associated with the at least one audio signal.

The apparatus caused to process the residual covariance property based on the spatial metadata associated with the at least one audio signal may be caused to: attenuate the residual covariance property when the spatial metadata indicates that the at least one audio signal is highly directional; and pass the residual covariance property unprocessed when the spatial metadata indicates that the at least one audio signal is fully ambient.

The apparatus caused to determine a target covariance property of the at least two output audio signals may be further caused to: generate an overall energy estimate based on the covariance property; determine head related transfer function data based on a direction parameter from the metadata associated with the at least one audio signal; and determine the target covariance property of the at least two output audio signals further based on the head related transfer function data and the overall energy estimate.

The apparatus may be further caused to determine the at least one property based on the at least one audio signal, wherein the at least one property is an audio type, and the apparatus caused to determine at least one control parameter configured to control an amount of the at least one decorrelated audio signal within at least two output audio signals for spatial audio reproduction may be further caused to: determine whether the audio type is a determined audio type; and determine the at least one control parameter based on the audio type is the determined audio type.

The determined audio type may be speech.

The at least one audio signal may comprise transport audio signals generated by an encoder.

According to a fourth aspect there is provided an apparatus comprising: receiving circuitry configured to receive a spatial audio signal, the spatial audio signal comprising at least one audio signal and spatial metadata associated with the at least one audio signal; generating circuitry configured to generate at least one decorrelated audio signal based on the at least one audio signal; determining circuitry configured to determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generating circuitry configured to generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

According to a fifth aspect there is provided a computer program comprising instructions [or a computer readable medium comprising program instructions] for causing an apparatus to perform at least the following: receive a spatial audio signal, the spatial audio signal comprising at least one audio signal and spatial metadata associated with the at least one audio signal; generate at least one decorrelated audio signal based on the at least one audio signal; determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

According to a sixth aspect there is provided a non-transitory computer readable medium comprising program instructions for causing an apparatus to perform at least the following: receive a spatial audio signal, the spatial audio signal comprising at least one audio signal and spatial metadata associated with the at least one audio signal; generate at least one decorrelated audio signal based on the at least one audio signal; determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

According to a seventh aspect there is provided an apparatus comprising: means for receiving a spatial audio signal, the spatial audio signal comprising at least one audio signal and spatial metadata associated with the at least one audio signal; means for generating at least one decorrelated audio signal based on the at least one audio signal; means for determining at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and means for generating the at least two output audio signals for spatial audio reproduction based on the spatial audio signal and at least one decorrelated audio signal, wherein the amount of the at least one decorrelated audio signal within at least two output audio signals is controlled based on the at least one control parameter.

According to an eighth aspect there is provided a computer readable medium comprising program instructions for causing an apparatus to perform at least the following: receive a spatial audio signal, the spatial audio signal comprising at least one audio signal and spatial metadata associated with the at least one audio signal; generate at least one decorrelated audio signal based on the at least one audio signal; determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata and at least one property determined based on the at least one audio signal; and generate the at least two output audio signals for spatial audio reproduction based on the spatial audio signal and at least one decorrelated audio signal, wherein the amount of the at least one decorrelated audio signal within at least two output audio signals is controlled based on the at least one control parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
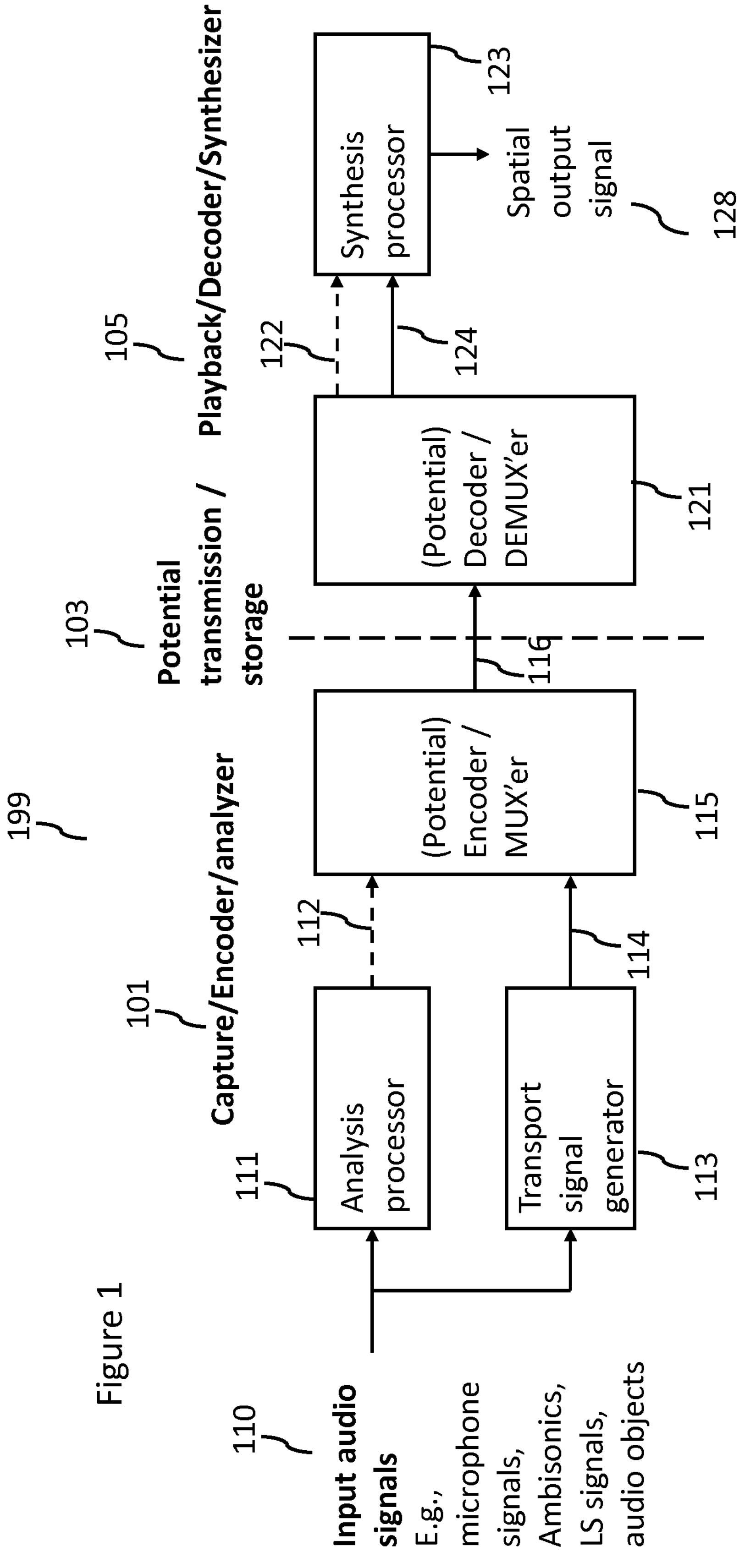
FIG. 1 shows schematically a system of apparatus suitable for implementing some embodiments.

The rendering of audio signals such as discussed above may produce good quality audio outputs, as they produce signals that have a covariance matrix that matches the target covariance matrix, and hence the spatial perception matches the target. Moreover, the decorrelated energy may be added when it is needed (i.e., when the needed incoherence cannot be obtained by mixing the input signals). Thus, artefacts caused by decorrelation (such as the perception of added reverberance) are minimized.

The term audio signal as used herein may refer to a single audio channel, or an audio signal with two or more channels.

In many situations, for example when the audio signals to be rendered contain mainly reverberation/ambience, the adverse effect of the (minimized amount of) decorrelation may be negligible. However, there are situations where, even when decorrelation is minimized, the amount of decorrelation degrades the sound quality. Namely, decorrelation is known to affect, in particular, the perception of certain sounds, such as speech and creating a too reverberant sound. Therefore, if the situation is that there are two audio sources at different directions, the incoherence to be synthesized may not exclusively be about reverberation/ambience, but about generating incoherence for rendering multiple sound sources. For such situations, the decorrelation artefacts may become audible even when implementing a least-squares optimized method. It may be possible to avoid the use of too much decorrelated energy by disabling the use of decorrelated energy. However, by disabling the use of decorrelated energy a perception of severely decreased spaciousness and envelopment may be generated, as the output signals would be mutually too coherent for rendering a faithful representation of ambient or reverberant sound scenes.

The concept as discussed within the embodiments herein may be able to overcome any issues in complex sound scenes which are either rendered as being too reverberant or lacking spaciousness and envelopment, thus deteriorating the audio quality.

The embodiments therefore relate to parametric spatial sound rendering. The spatial parameter estimation may be based on microphone array signals. One example of determining spatial metadata involving directions and ratio parameters is Directional Audio Coding (DirAC) such as discussed in Pulkki, V., 2007. Spatial sound reproduction with directional audio coding. Journal of the Audio Engineering Society, 55(6), pp. 503-516, which uses as an input first-order capture signals. A variant of DirAC is the Higher-order DirAC Politis, A., Vilkamo, J. and Pulkki, V., 2015, "Sector-based parametric sound field reproduction in the spherical harmonic domain", IEEE Journal of Selected Topics in Signal Processing, 9 (5), pp. 852-866, which provides a multitude of simultaneous directional estimates. Many further parameter estimation methods exist any of which may be implemented in some embodiments, for example, GB published patent application GB1619573.7 described suitable means to obtain 360/3D spatial metadata from horizontally flat devices such as mobile phones. Any of the known spatial metadata determination techniques may be applied for some embodiments.

The embodiments discussed herein relate to rendering of parametric audio signals (containing one or more audio signals and spatial metadata) for example at a spatial audio decoder. The embodiments may be configured to improve upon state-of-the art rendering techniques that uses measurement of the input signal properties to control the rendering and optimising the needed amount of decorrelation to achieve the desired spatial output. The embodiments further provide means for controlling the amount of applied decorrelated sound so as to suppress decorrelated sound at rendering those sound scenes where the remaining decorrelation is expected to have detrimental effect to the perceived audio quality, while preserving decorrelation otherwise to preserve the appropriate spaciousness. The reduction of the decorrelation may in some embodiments be based on monitoring the spatial metadata, where based on the direct-to-total energy ratio parameters the extent of suppressing the applied decorrelated sound energy is determined.

The concept as discussed in the embodiments herein relates to spatial audio reproduction of audio signals and associated spatial metadata containing information how to render the audio signals spatially, where embodiments are provided that can render direct sound sources (even multiple simultaneous direct sound sources) without distracting decorrelation artefacts (such as added reverberance) while preserving the correct spaciousness and envelopment for reverberant/ambient sounds. Furthermore these embodiments may be configured to determine input covariance properties of input signals and the target covariance properties of the output signals, determine the required amount of decorrelated energy to reach the target covariance properties, determine a limitation of the amount of decorrelated energy based on the spatial metadata, decorrelate the input audio signals, and render spatial output signals based on the input audio signals, the decorrelated input audio signals, the determined limitation of the decorrelation, and the covariance properties.

In some embodiments, the determined covariance properties are a covariance matrix of the input signals, and the target covariance properties are a target covariance matrix (derived based on the audio signals and the associated spatial metadata). Based on the determined covariance properties a mixing matrix may be derived. Moreover, some embodiments may be configured to determine the amount of decorrelated energy needed to obtain the incoherence properties of the target covariance matrix. Next, some embodiments may be configured to limit the amount of decorrelated energy based on the spatial metadata. For example if the spatial metadata contains direct-to-total energy ratios, the maximum amount of decorrelated energy may be limited using a factor 1-sum(direct-to-total energy ratios). Finally, in some embodiments the spatial audio signals (e.g., binaural audio signals) are rendered using the input audio signals, the decorrelated input audio signals, the limiting information, and the mixing matrices.

In some embodiments the direct sound components can be rendered mostly using mixing and/or (complex-valued) gain processing, without prominent decorrelation, and thus the decorrelation artefacts are avoided. Furthermore, in some embodiments, the ambient/reverberant components are decorrelated when needed, and thus the spaciousness and envelopment is preserved. As a result, the embodiments may be configured to provide good audio quality, even with multiple direct sound sources and with reverberation/ambience, by avoiding decorrelation artefacts and still maintaining the spaciousness and envelopment.

The embodiments as discussed herein are designed with the knowledge that perception of spaciousness of reverberation relates to the inter-aural correlation provided to the listener. For example, Borss, C. and Martin, R., 2009, February, “An improved parametric model for perception-based design of virtual acoustics”, In Audio Engineering Society 35th International Conference identifies that when generating binaural reverberation (which is an example of ambience in general), the inter-aural cross correlation needs to be low or zero at middle and high frequencies to generate a natural spacious perception for the listener. In other words, the left and right ear signals need to be incoherent in a suitable extent. In parametric spatial audio reproduction, there are situations where the input signals do not have such incoherence, and thus the decorrelating procedures are applied to generate the incoherence and, as result, the appropriate perception of spaciousness.

Furthermore the embodiments are designed with the knowledge that decorrelation affects different sounds differently. For example, Vilkamo, J. and Pulkki, V., 201, “Minimization of decorrelator artifacts in directional audio coding by covariance domain rendering”, Journal of the Audio Engineering Society, 61(9), pp. 637-646 shows a listening test involving two different means to render spatial sound, where the first method was the one defined earlier in Vilkamo, J., Bäckström, T. and Kuntz, A., 2013, “Optimized covariance domain framework for time-frequency processing of spatial audio”, Journal of the Audio Engineering Society, 61(6), pp. 403-411 and a second method was a prior method not optimizing the amount of the applied decorrelated sound energy. The effective difference of these methods is primarily the relative amount of decorrelated sound energy, as the first method utilizes the existing independent signals at the input more effectively. The listening test provided results of perceived quality for the two methods for different sound scenes. From the results it is seen that the quality of speech is degraded by a significant amount by an increased amount of decorrelation. On the other hand, it is known that reverberation (or more generally, complex background ambience) is not affected by well-configured decorrelation procedures, because such signals are already naturally decorrelated and further decorrelation has little or no adverse effect to the perceived quality of such sounds.

The embodiments thus may be configured to introduce beneficial balancing between the decorrelation (artefacts) and perception of spaciousness (or lack thereof). The embodiments may be configured to implement this in a way that:

Sound situations where the quality is expected degrade particularly from decorrelation are processed with reduced amount of decorrelation. An example of such a situation is two overlapping talkers (or a talker and an overlapping other sound source). In this situation, with the present invention the perception of width may be reduced temporarily, but the vastly greater benefit of avoiding decorrelation artefacts is provided.

Sound situations where the quality is not expected to degrade particularly from decorrelation are processed with the appropriate amount of decorrelation. An example of such a situation is reverberating sound. This provides the appropriate sense of spaciousness for such situations.

Thus the embodiments as discussed herein are configured to provide an improved balance combining good audio quality and maintaining spaciousness, when with prior art only one of these goals can be achieved.

In some embodiments, as described in further detail hereafter, an audio processing apparatus is configured to receive a spatial audio signal. The spatial audio signal may comprise at least one audio signal and spatial metadata associated with the at least one audio signal. The audio processing apparatus may then in some embodiments be configured to determine at least one covariance property associated with the at least one audio signal.

A target covariance property (which is a target property associated with the spatial audio signals to be output) may be determined at least based on the spatial metadata. In some embodiments the audio processing apparatus may then be further configured to determine a mixing matrix (or other suitable control) based on the at least one covariance property and the target covariance property.

Furthermore the audio processing apparatus can be configured in some embodiments to generate at least one decorrelated audio signal based on the at least one audio signal. A residual covariance property may furthermore be determined by the audio processing apparatus based on the at least one covariance property, the target covariance property and the mixing matrix.

The audio processing apparatus may then suppress the decorrelated energy based on the spatial metadata by attenuating the residual covariance property (and produce a processed residual covariance property).

In some embodiments a residual mixing matrix is determined by the audio processing apparatus using the processed residual covariance property and the at least one covariance property.

The audio processing apparatus furthermore may be configured to generate at least two output signals for spatial audio reproduction by applying the mixing matrix on the at least one audio signal and by applying the residual mixing matrix on the at least one decorrelated audio signal.

In other words in some embodiments a spatial audio signal may comprise at least one audio signal and spatial metadata associated with the at least one audio signal. At least one decorrelated audio signal based on the at least one audio signal is also generated. At least one control parameter may then be determined, the at least one control parameter configured to control an amount of the at least one decorrelated audio signal within at least two output audio signals for spatial audio reproduction. The at least one control parameter can be determined in some embodiment at least based on at least one target further property of the at least two output audio signals (for example a target covariance property of the at least two output audio signals) and at least one of: the spatial metadata and at least one property (for example an audio type) determined based on the at least one audio signal.

Then the at least two output signals for spatial audio reproduction may be generated based on the spatial audio signal and at least one decorrelated audio signal, wherein the amount of the at least one decorrelated audio signal within at least two output audio signals is controlled based on the at least one control parameter.

We will initially discuss the embodiments with respect to an example capture (or encoder/analyser) and playback (or decoder/synthesizer) apparatus or system as shown in FIG. 1.

The system 199 is shown with capture (encoder/analyser) 101 part and a playback (decoder/synthesizer) 105 part.

The capture part 101 in some embodiments comprises an audio signals input configured to receive input audio signals 110. The input audio signals can be from any suitable source, for example: two or more microphones mounted on a mobile phone; other microphone arrays, e.g., B-format microphone or Eigenmike; Ambisonic signals, e.g., first-order Ambisonics (FOA), higher-order Ambisonics (HOA); Loudspeaker surround mix and/or objects. The input audio signals 110 may be provided to an analysis processor 111 and to a transport signal generator 113.

The capture part 101 may comprise an analysis processor 111. The analysis processor 111 is configured to perform spatial analysis on the input audio signals yielding suitable metadata 112. The purpose of the analysis processor 111 is thus to estimate spatial metadata in frequency bands. For all of the aforementioned input types, there exists known methods to generate suitable spatial metadata, for example directions and direct-to-total energy ratios (or similar parameters such as diffuseness, i.e., ambient-to-total ratios) in frequency bands. These methods are not detailed herein, however, some examples may comprise the performing of a suitable time-frequency transform for the input signals, and then in frequency bands when the input is a mobile phone microphone array, estimating delay-values between microphone pairs that maximize the inter-microphone correlation, and formulating the corresponding direction value to that delay (as described in GB Patent Application Number 1619573.7 and PCT Patent Application Number PCT/FI2017/050778), and formulating a ratio parameter based on the correlation value.

The metadata can be of various forms and can contain spatial metadata and other metadata. A typical parameterization for the spatial metadata is one direction parameter in each frequency band DOA(k,n) and an associated direct-to-total energy ratio in each frequency band r(k,n), where k is the frequency band index and n is the temporal frame index. Determining or estimating the directions and the ratios depends on the device or implementation from which the audio signals are obtained. For example the metadata may be obtained or estimated using spatial audio capture (SPAC) using methods described in GB Patent Application Number 1619573.7 and PCT Patent Application Number PCT/FI2017/050778. In other words, in this particular context, the spatial audio parameters comprise parameters which aim to characterize the sound-field.

The spatial metadata in some embodiments may contain information to render the audio signals to a spatial output, for example to a binaural output, surround loudspeaker output, crosstalk cancel stereo output, or Ambisonic output. For example in some embodiments the spatial metadata may further comprise any of the following (and/or any other suitable metadata):

loudspeaker level information;
inter-loudspeaker correlation information;
information on the amount of spread coherent sound;
information on the amount of surrounding coherent sound.

In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

When the input is a FOA signal or B-format microphone the analysis processor 111 can be configured to determine parameters such as an intensity vector, based on which the direction parameter is obtained, and to compare the intensity vector length to the overall sound field energy estimate to determine the ratio parameter. This method is known in the literature as Directional Audio Coding (DirAC).

When the input is HOA signal, the analysis processor 111 may either take the FOA subset of the signals and use the method above, or divide the HOA signal into multiple sectors, in each of which the method above is utilized. This sector-based method is known in the literature as higher order DirAC (HO-DirAC). In this case, there is more than one simultaneous direction parameter per frequency band.

When the input is loudspeaker surround mix and/or objects, the analysis processor 111 may be configured to convert the signal into a FOA signal(s) (via use of spherical harmonic encoding gains) and to analyse direction and ratio parameters as above.

As such the output of the analysis processor 111 is spatial metadata determined in frequency bands. The spatial metadata may involve directions and ratios in frequency bands but may also have any of the metadata types listed previously. The spatial metadata can vary over time and over frequency.

In some embodiments the spatial analysis may be implemented external to the system 199. For example in some embodiments the spatial metadata associated with the audio signals may be provided to an encoder as a separate bit-stream. In some embodiments the spatial metadata may be provided as a set of spatial (direction) index values.

The capture part 101 may comprise a transport signal generator 113. The transport signal generator 113 is configured to receive the input signals and generate a suitable transport audio signal 114. The transport audio signal may be a stereo or mono audio signal. The generation of transport audio signal 114 can be implemented using a known method such as summarised below.

When the input is mobile phone microphone array audio signals, the transport signal generator 113 may be configured to select a left-right microphone pair, and applying suitable processing to the signal pair, such as automatic gain control, microphone noise removal, wind noise removal, and equalization.

When the input is a FOA/HOA signal or B-format microphone, the transport signal generator 113 may be configured to formulate directional beam signals towards left and right directions, such as two opposing cardioid signals.

When the input is loudspeaker surround mix and/or objects, the transport signal generator 113 may be configured to generate a downmix signal that combines left side channels to left downmix channel, and same for right side, and adds centre channels to both transport channels with a suitable gain.

In some embodiments the input audio signals bypass the transport signal generator 113. For example, in some situations, where the analysis and synthesis occurs at the same device at a single processing step, without intermediate encoding. The number of transport channels can also be any suitable number (rather than one or two channels as discussed in the examples).

In some embodiments the capture part 101 may comprise an encoder/multiplexer 115. The encoder/multiplexer 115 can be configured to receive the transport audio signals 114 and the metadata 112. The encoder/multiplexer 115 may furthermore be configured to generate an encoded or compressed form of the metadata information and transport audio signals. In some embodiments the encoder/multiplexer 115 may further interleave, multiplex to a single data stream 116 or embed the metadata within encoded audio signals before transmission or storage. The multiplexing may be implemented using any suitable scheme.

The encoder/multiplexer 115 for example could be implemented as an IVAS encoder, or any other suitable encoder. The encoder/multiplexer 115 thus is configured to encode the audio signals and the metadata and form a bit stream 116 (e.g., an IVAS bit stream).

This bitstream 116 may then be transmitted/stored 103 as shown by the dashed line. In some embodiments there is no encoder/multiplexer 115 (and thus no decoder/demultiplexer 121 as discussed hereafter).

The system 199 furthermore may comprise a playback (decoder/synthesizer) part 105. The playback part 105 is configured to receive, retrieve or otherwise obtain the bitstream 116, and from the bitstream generate suitable audio signals to be presented to the listener/listener playback apparatus.

The playback part 105 may comprise a decoder/demultiplexer 121 configured to receive the bitstream and demultiplex the encoded streams and then decode the audio signals to obtain the transport signals 124 and metadata 122.

Furthermore in some embodiments, as discussed above there may not be any demultiplexer/decoder 121 (for example where there is no associated encoder/multiplexer 115 as both the capture part 101 and the playback part 105 are located within the same device).

The playback part 105 may comprise a synthesis processor 123. The synthesis processor 123 is configured to obtain the transport audio signals 124, the spatial metadata 122 and produce a spatial output signal 128 for example a binaural audio signal that can be reproduced over headphones.

Figure 2:
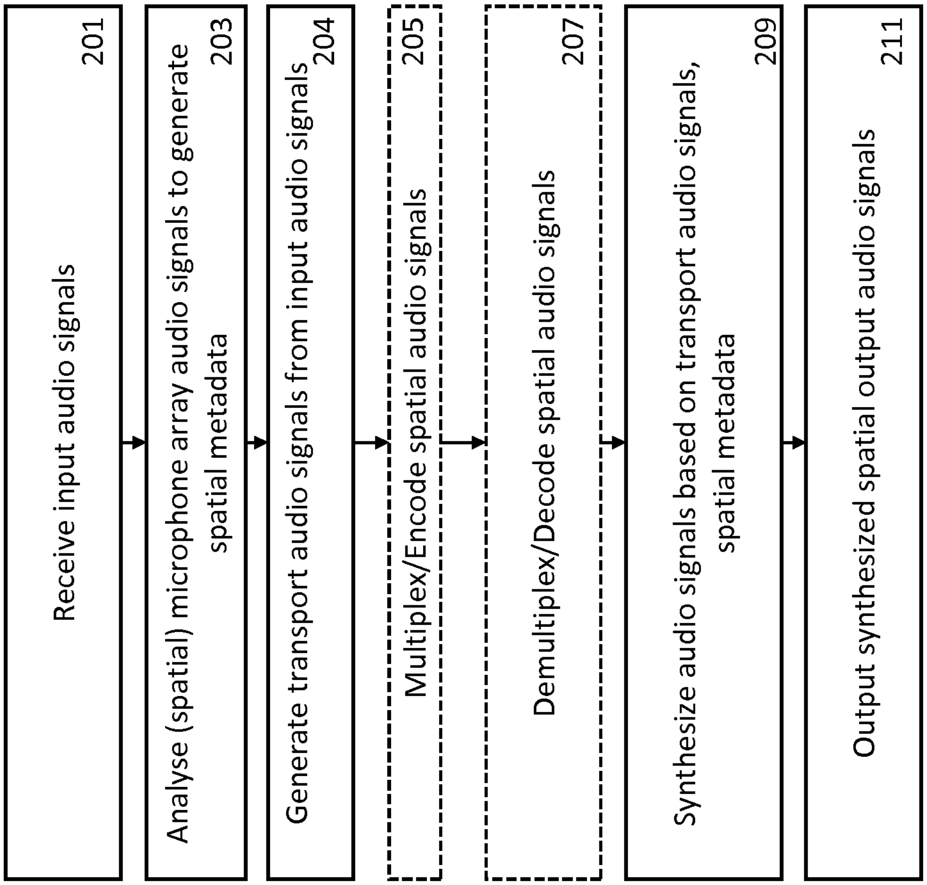
FIG. 2 shows a flow diagram of the operation of the example apparatus according to some embodiments.

The operations of this system are summarized with respect to the flow diagram as shown in FIG. 2.

FIG. 2 shows for example the receiving of the input audio signals as shown in step 201.

Then the flow diagram shows the analysis (spatial) of the input audio signals to generate the spatial metadata as shown in FIG. 2 by step 203.

The transport audio signals are then generated from the input audio signals as shown in FIG. 2 by step 204.

The generated transport audio signals and the metadata may then be encoded and/or multiplexed as shown in FIG. 2 by step 205. This is shown in FIG. 2 as an optional dashed box.

The encoded and/or multiplexed signals can furthermore be demultiplexed and/or decoded to generate transport audio signals and spatial metadata as shown in FIG. 2 by step 207. This is also shown as an optional dashed box.

Then spatial audio signals can be synthesized based on the transport audio signals and spatial metadata as shown in FIG. 2 by step 209.

The synthesized spatial audio signals may then be output to a suitable output device, for example a set of headphones, as shown in FIG. 2 by step 211.

Figure 3:
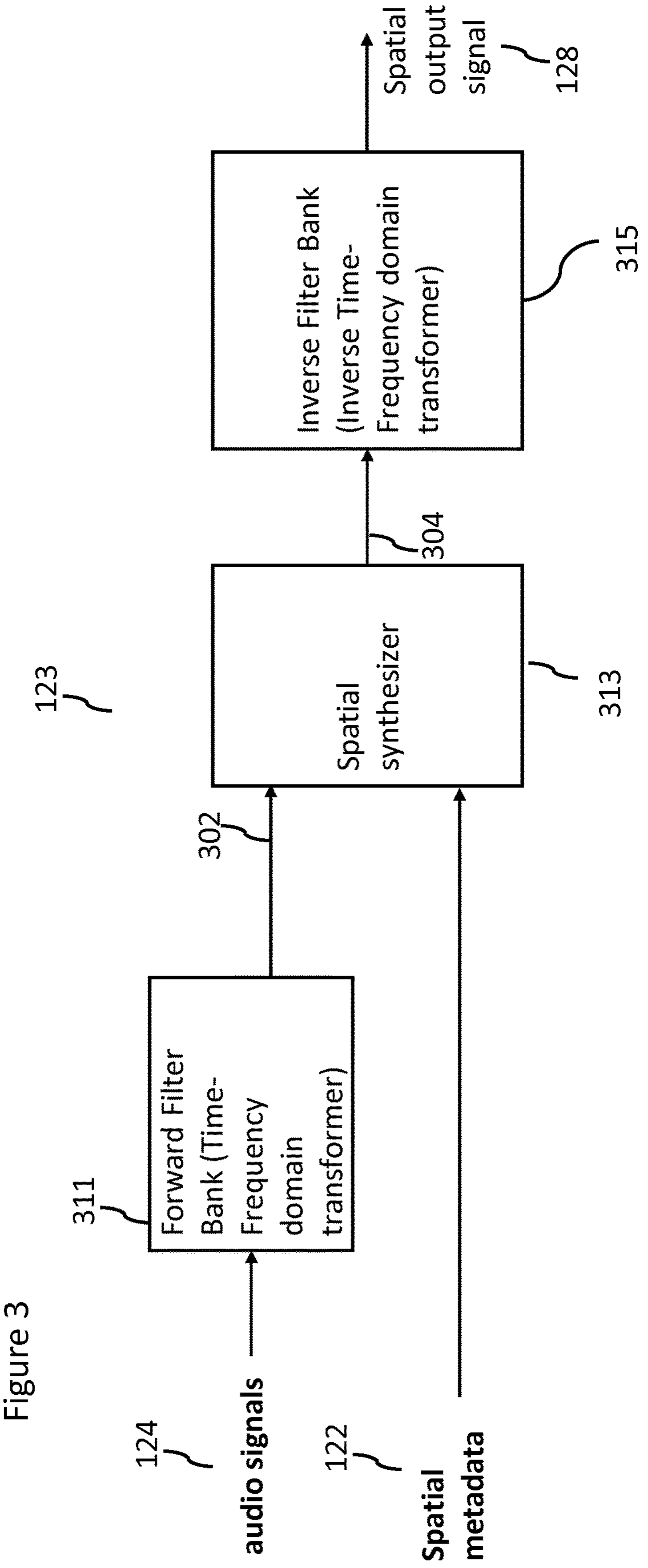
FIG. 3 shows schematically an example synthesis processor as shown in FIG. 1 according to some embodiments.

With respect to FIG. 3 is shown the synthesis processor 123 in further detail. In some embodiments the synthesis processor 123 comprises a Forward Filter Bank (time-frequency transformer) 311. The Forward Filter Bank (time-frequency transformer) 311 is configured to receive the (time-domain) transport audio signals 124 and convert them to the time-frequency domain. Suitable forward filters or transforms include, e.g., short-time Fourier transform (STFT) and complex-modulated quadrature mirror filterbank (QMF). The resulting signals may be denoted as $x_i(b,n)$, where i is the channel index, b the frequency bin index of the time-frequency transform, and n the time index. The time-frequency signals are for example expressed here in a vector form (for example for two channels the vector form is):

$$x(b, n) = \begin{bmatrix} x_1(b, n) \\ x_2(b, n) \end{bmatrix}$$

The following processing operations may then be implemented within the time-frequency domain and over frequency bands. A frequency band can be one or more frequency bins (individual frequency components) of the applied time-frequency transformer (filter bank). The frequency bands could in some embodiments approximate a perceptually relevant resolution such as the Bark frequency bands, which are spectrally more selective at low frequencies than at the high frequencies. Alternatively, in some implementations, frequency bands can correspond to the frequency bins. The frequency bands may be those (or approximate those) where the spatial metadata has been determined by the analysis processor. Each frequency band k may be defined in terms of a lowest frequency bin $b_{low}(k)$ and a highest frequency bin $b_{high}(k)$.

The time-frequency transport signals 302 in some embodiments may be provided to a spatial synthesizer 313.

The synthesis processor 123 in some embodiments comprises a spatial synthesizer 313 configured to receive the time-frequency domain transport signals 302 and spatial metadata 122 and generate spatial time-frequency audio signals 304 by processing of the time-frequency transport signals 302 based on the spatial metadata 122.

The synthesis processor 123 in some embodiments comprises an Inverse Filter Bank 315 configured to receive the spatial time-frequency domain audio signals 304 and applies an inverse transform corresponding to the transform applied by the Forward Filter Bank 311 to generate a time domain spatial output signal 128. The output of the Inverse Filter Bank 315 may thus be spatial output signal, which could be, for example, a binaural audio signal for headphone listening.

Figure 4:
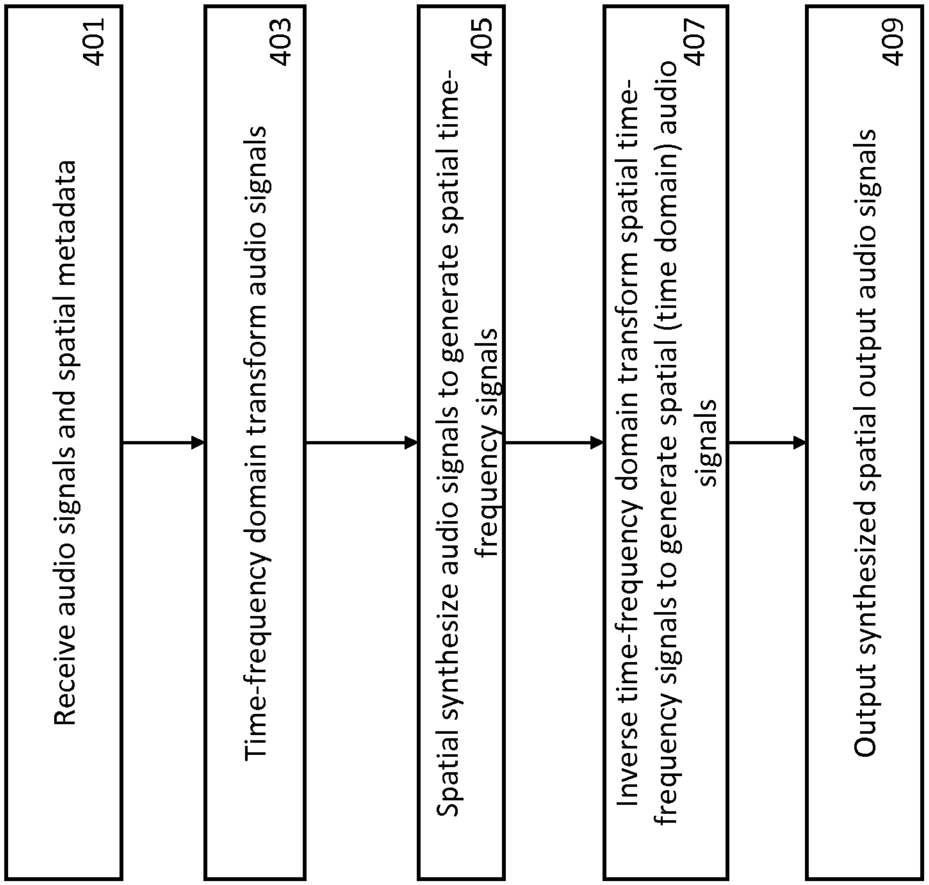
FIG. 4 shows a flow diagram of the operation of the example synthesis processor as shown in FIG. 3 according to some embodiments.

The operations of this synthesis processor 123 are summarized with respect to the flow diagram as shown in FIG. 4.

FIG. 4 shows for example the receiving of the audio signals and spatial metadata as shown in step 401.

Then the audio signals are time-frequency domain transformed to generate the time-frequency domain audio signals as shown in FIG. 4 by step 403.

The time-frequency domain audio signals are then processed based on the spatial metadata to generate spatial time-frequency domain audio signals as shown in FIG. 4 by step 405.

The spatial time-frequency domain audio signals can then in be inverse transformed to generate spatial (time domain) audio signals as shown in FIG. 4 by step 407.

The synthesized spatial audio signals can then be output as shown in FIG. 4 by step 409.

Figure 5:
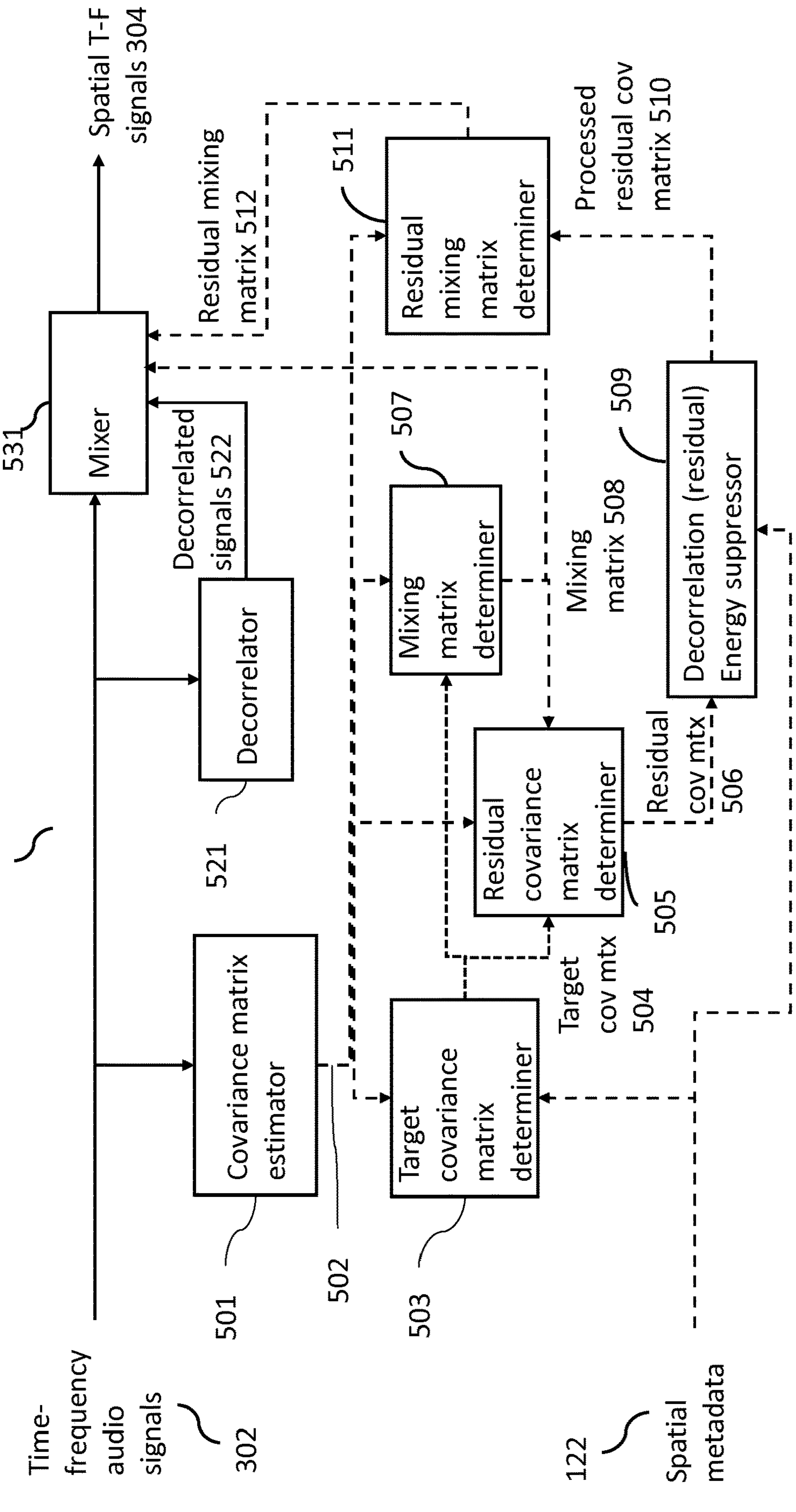
FIG. 5 shows schematically an example spatial synthesizer as shown in FIG. 3 according to some embodiments.

An example of the spatial synthesiser 313 of FIG. 3 is shown in further detail in FIG. 5. In the following example the audio signals comprise two channels, one "left" and one "right" channel. However it would be understood that there are embodiments which may implement the same methods for any number of channels by a person skilled in the art without any further inventive input.

As shown in FIG. 5, the time-frequency audio signals 302 can be provided to a mixer 531, decorrelator 521 and covariance matrix estimator 501. The spatial metadata 122 is provided to a target covariance matrix determiner 503 and a decorrelation (residual) energy suppressor 509.

In some embodiments the spatial synthesiser 313 comprises a covariance matrix estimator 501. The covariance matrix estimator 501 is configured to receive the time-frequency audio signals 302 and estimates a covariance matrix of the time-frequency audio signals and their overall energy estimate (in frequency bands). The covariance matrix can for example in some embodiments be estimated as:

$$C_x(k,n) = \sum_{b=b_{low}(k)}^{b_{high}(k)} x(b,n)x^H(b,n).$$

where superscript H denotes a complex conjugate and $b_{low}$ (k) and $b_{high}$(k) are the lowest and highest bin indices of frequency band k. The frequency bins can in some embodiments be the bins of the applied time-frequency transform, and the frequency bands are typically configured to contain a larger number of bins towards the higher frequencies. The frequency bands may be such that at which the spatial metadata has been determined. In some embodiments $C_x$(k,n) is averaged over time using a FIR or IIR (or any) window. The estimated covariance matrix 502 can in some embodiments be output to a target covariance matrix determiner 503, a residual covariance matrix determiner 505, mixing matrix determiner 507 and residual mixing matrix determiner 511.

In some embodiments the spatial synthesiser 313 comprises a target covariance matrix estimator 503. The target covariance matrix estimator 503 is configured to receive the estimated covariance matrix 502 and the spatial metadata 122. In this example, the spatial metadata contains one or more direction parameters DOA(k,n, p) for each frequency index k and temporal index n, where p=1 . . . P, and P is the number of direction parameters (for a given time and frequency). In some embodiments P may vary as a function of frequency and/or time, and in some embodiments P may be constant, e.g., 1 or 2. In this example, the spatial metadata further comprises a direct-to-total ratio parameter r(k,n, p) that indicates the amount of energy associated with direction DOA(k,n, p) when compared to the overall sound energy. With such a definition it holds that $\Sigma_{p=1}^{P}$r(k,n, p)≤1.

The target covariance matrix determiner 503 in some embodiments is configured to first determine an overall energy value E(k,n) as the sum (or mean) of the diagonal elements of $C_x$(k,n). In some embodiments this value can be determined in the covariance matrix estimator 501 and obtained from the covariance matrix estimator 501. In some embodiments where the output of the processing results in a binaural audio signal, the target covariance matrix determiner 503 is configured to formulate for each DOA(k,n, p) a head related transfer function (HRTF) 2×1 column vector h(DOA(k,n, p), k) containing the left and right ear complex responses (amplitude and phase) for the given DOA(k,n, p) and corresponding to the frequency (e.g., centre frequency) of band k. In some embodiments a diffuse field binaural covariance matrix may be obtained by selecting a uniform spatial distribution of directions $DOA_d$ where d=1 . . . D and by $$C_{diff}(k) = \frac{1}{D}\sum_{d=1}^{D} h(DOA_d, k)h^H(DOA_d, k)$$

Then, the target covariance matrix determiner in some embodiments is configured to determine the target covariance matrix as $$C_y(k,n) = C_{diff}(k)E(k,n)\left(1 - \sum_{p=1}^{P} r(k,n,p)\right) + \sum_{p=1}^{P} r(k,n,p)E(k,n)h(DOA(k,n,p),k)h^H(DOA(k,n,p),k)$$

The target covariance matrix can then in some embodiments be output to the residual covariance matrix determiner 505 and the mixing matrix determiner 507.

In some embodiments the spatial synthesiser 313 comprises a mixing matrix determiner 507. The mixing matrix determiner 507 is configured to receive the target covariance matrix 504 and the estimated covariance matrix 502. The mixing matrix determiner 507 in some embodiments is configured to determine a mixing matrix. In some embodiments this determination may employ the method as described in Vilkamo, J., Bäckström, T. and Kuntz, A., 2013, "Optimized covariance domain framework for time-frequency processing of spatial audio", Journal of the Audio Engineering Society, 61(6), pp. 403-411. This method utilizes a prototype matrix which may be set in case of binaural reproduction for example to $$Q = \begin{bmatrix} 1 & 0.05 \\ 0.05 & 1 \end{bmatrix}.$$

If the user's head orientation is tracked, then the prototype matrix could be changed to $$Q=\begin{bmatrix}0.05 & 1\\ 1 & 0.05\end{bmatrix}$$

when the user is facing rear directions (beyond 90 degrees left or right). In summary the embodiments are configured to provide a mixing matrix M(k,n) which, when applied to the input signals having the covariance matrix $C_x$(k,n), provides output signals that have a covariance matrix that resembles the target covariance matrix $C_y$ (k,n). This mixing solution may be least squares optimized with respect to a prototype signal Qx(b,n). The formulation of the mixing matrix may in some embodiments be regularized to avoid arbitrarily large amplifications of small independent signal components, and thus in practice in many situations the target covariance matrix is not fully reached. For this reason a residual signal is formulated, as described in the following. The mixing matrix determiner 507 is configured to output the mixing matrix M(k,n) 508 to the mixer 531 and a residual covariance matrix determiner 505.

In some embodiments the spatial synthesiser 313 comprises a residual covariance matrix determiner 505. The residual covariance matrix determiner 505 is configured to receive the estimated covariance matrix $C_x$(k,n) 502, target covariance matrix $C_y$(k,n) 504 and mixing matrix M(k,n) 508. The residual covariance matrix determiner 505 is configured to determine a residual covariance matrix, which is formulated as:

$$C_r(k,n)=C_y(k,n)-M(k,n)C_x(k,n)M^H(k,n)$$

In other words, the residual covariance matrix contains the information of the difference of the target covariance matrix $C_y$(k,n) and what was achieved with processing the input signals with M(k,n). The residual covariance matrix determiner 505 is configured to provide the residual covariance matrix $C_r$(k,n) 506 to a decorrelation (residual) energy suppressor 509.

In some embodiments the spatial synthesiser 313 comprises a decorrelation (residual) energy suppressor 509. The decorrelation (residual) energy suppressor 509 is configured to receive the residual mixing matrix $C_r$(k,n) 506 and the spatial metadata 122. The decorrelation (residual) energy suppressor 509 is configured to generate a processed residual covariance matrix 510. The residual signal is generated (as described further below) based on decorrelated versions of the input signals, because new independent signals are needed to reach the incoherence if the target covariance matrix indicates so. However, the need to synthesize incoherence to the output signals may originate from a multitude of reasons. One potential reason is that there is actually ambience or reverberation, and another potential reason is that there are multiple simultaneous sources active. If the residual signal would not be synthesized, the ambience would sound less spatial. If the residual signal is fully synthesized, then there are situations that the decorrelation causes degradation of sound quality for the more directional sounds. Therefore, the decorrelation (residual) energy suppressor 509 is configured to process or modify the residual covariance matrix based on the spatial metadata. For example, the modification in some embodiments could be $$C_r'(k,n)=\left(1-\sum_{p=1}^{P}r(k,n,p)\right)C_r(k,n)$$

In this example the covariance matrices are determined at the same temporal resolution as the metadata (e.g. ratio) parameters. In some embodiments the metadata may be determined a different temporal resolution, for example, multiple temporal indices of the metadata contribute to one temporal index of the covariance matrices. If that were the case, it is for example an option to take temporal average (or energy weighted temporal average) of the ratio parameters prior to this exemplified formula to modify the residual covariance matrix.

Thus, for example, when the sound is fully ambient, the residual covariance matrix is unprocessed, and when the sound is only directional sounds, the residual covariance matrix becomes zero. The decorrelation (residual) energy suppressor therefore is configured to provide the processed residual covariance matrix $C'_r$(k,n) 510 to the residual mixing matrix determiner 511.

In some embodiments the spatial synthesiser 313 comprises a residual mixing matrix determiner 511. The residual mixing matrix determiner 511 is configured to receive the processed residual covariance matrix $C'_r$(k,n) 510 and the estimated covariance matrix $C_x$(k,n) 502. The residual mixing matrix determiner 511 operates in a similar manner to the mixing matrix determiner 507 but in place of the covariance $C_x$(k,n) matrix 502 it uses a diagonalized version of the input covariance matrix. In other words, the matrix has the entries of the covariance matrix $C_x$(k,n) 502 at its diagonal, but zeros otherwise. This is since the residual mixing matrix is formulated for processing decorrelated versions of the input signals. Furthermore, the target covariance matrix in this case is the processed residual covariance matrix $C'_r$(k,n) 510. Otherwise the processing is similar to the mixing matrix determiner 507. The residual mixing matrix determiner 511 is configured to output the resulting residual mixing matrix 512, denoted $M_r$ (k,n), to the mixer 531.

In some embodiments the spatial synthesiser 313 comprises a decorrelator 521. The decorrelator 521 is configured to receive the time-frequency audio signals x(b,n) 302 and generate a decorrelated d(b,n) version 522 thereof. The decorrelated audio signals d(b,n) 522 are then passed to the mixer 531.

In some embodiments the spatial synthesiser 313 comprises a mixer 531. The mixer 531 is configured to receive the time-frequency audio signals 302 and decorrelated audio signals d(b,n) 522 and generate a mix based on the mixing matrix 508 M(k,n) and the residual mixing matrix $M_r$(k,n) 512. The mixer 531 can for example generate the output by $$y(b,n)=M(k,n)x(b,n)+M_r(k,n)d(b,n),$$

where band index k is that where bin b resides. This output signal is the spatial time-frequency signals 304, which is the output of the spatial synthesizer as shown in FIG. 3.

Figure 6:
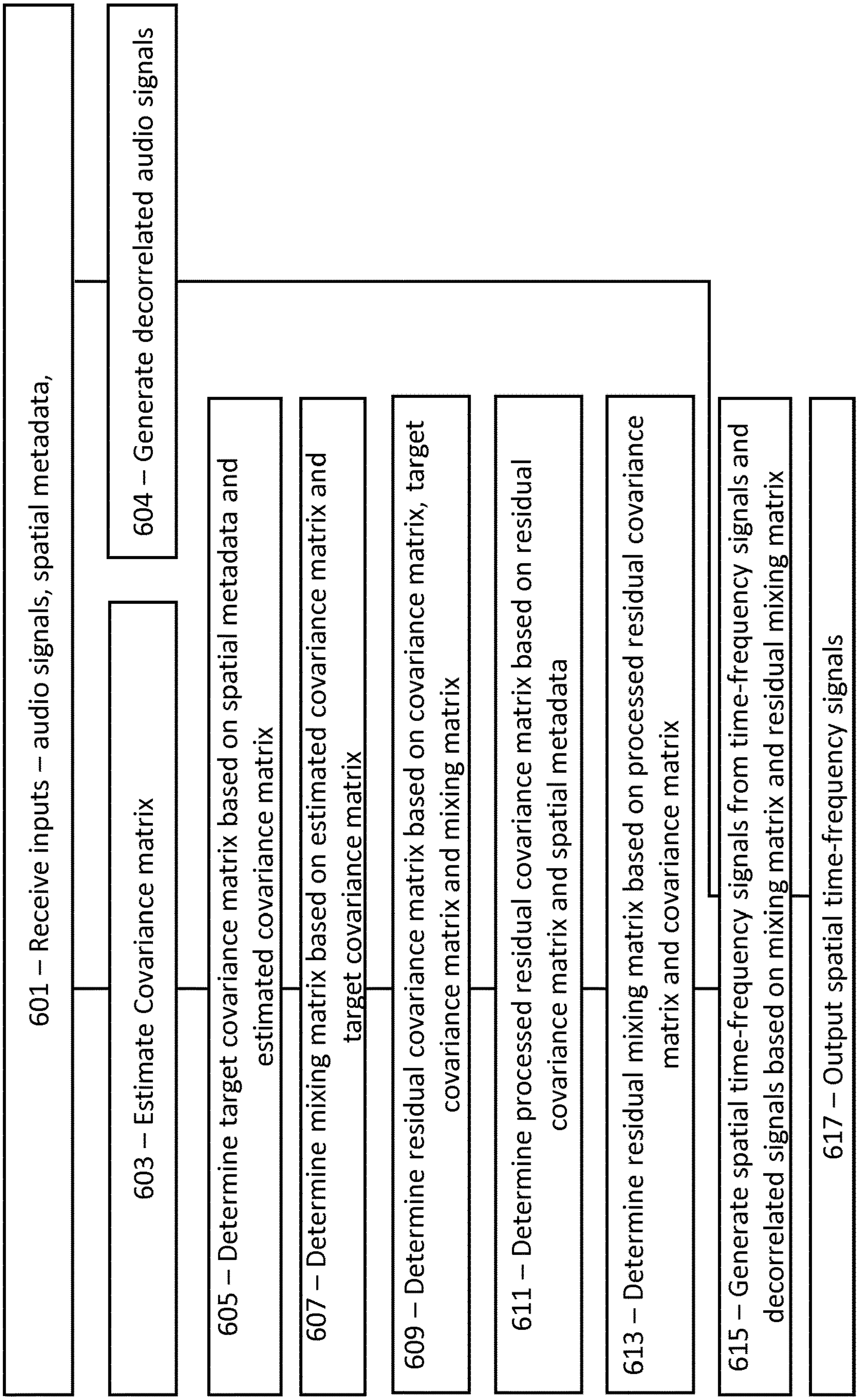
FIG. 6 shows a flow diagram of the operation of the example spatial synthesizer as shown in FIG. 5 according to some embodiments.

The operations of the spatial synthesiser 313 are summarized with respect to the flow diagram as shown in FIG. 6.

The inputs, such as audio signals and spatial metadata are received as shown in FIG. 6 by step 601.

The next operation is one of estimating the covariance matrix as shown in FIG. 6 by step 603.

The target covariance matrix is then generated based on the spatial metadata and estimated covariance matrix as shown in FIG. 6 by step 605.

The mixing matrix is then determined based on the estimated covariance matrix and target covariance matrix as shown in FIG. 6 by step 607.

Then the residual covariance matrix is determined based on covariance matrix, target covariance matrix and mixing matrix as shown in FIG. 6 by step 609.

Having determined the residual covariance matrix the processed residual covariance matrix is determined based on residual covariance matrix and spatial metadata as shown in FIG. 6 by step 611.

Then the residual mixing matrix is determined based on processed residual covariance matrix and covariance matrix as shown in FIG. 6 by step 613.

With this the decorrelated audio signals are generated as shown in FIG. 6 by step 604.

The spatial time-frequency audio signals are then determined based on the time-frequency audio signals, decorrelated audio signals, mixing matrix and residual mixing matrix as shown in FIG. 6 by step 615.

The spatial time-frequency audio signals are then output as shown in FIG. 6 by step 617.

The above described processing the audio signals in frequency bands. In some embodiments the processing is all performed in frequency bins. In such a embodiments, all matrices, HRTFs and other values are determined for each frequency bin. Since the spatial metadata has been defined in frequency bands k, then when selecting for example a DOA-value (or any other metadata) for bin b, then the DOA value for the band k where bin b resides is selected.

In some embodiments the above procedure may be configured also for spatial outputs other than binaural audio signals. For example, the target covariance matrices may be determined based on vectors containing loudspeaker amplitude panning gains in place of HRTFs. Furthermore, in loudspeaker output, the diffuse field covariance matrix is a diagonal matrix.

The above formulation, for simplicity of the expression, assumed that the time resolution of the time-frequency signal is the same as the time resolution of the spatial metadata. This may be true when the time-frequency transform has many bins, for example, it uses a 2048 point short-time Fourier transform (STFT). In other embodiments, the filter bank could be, for example, a 60-bin complex modulated quadrature mirror filter (QMF) bank, which results in a much higher temporal resolution. In such embodiments the metadata is not every temporal index n, but the indices associated with the metadata are sparser (in time).

In some embodiments the amount of decorrelated energy can be limited using the following equation $$C_r'(k,n) = \min(1, A)C_r(k,n)$$

$$A = \frac{\left(1 - \sum_{d=1}^{d} r(k,n,d)\right) tr(C_y(k,n))}{tr(C_r(k,n))}$$

where tr( ) is the trace of the matrix. A practical implementation of such an embodiments limits the amount of decorrelated energy at most to be $(1-\Sigma_{d=1}{}^{d}r(k,n))$ of the total energy. As previously discussed other formulations for the decorrelation limitation can be used.

In the embodiments as discussed herein the limitation of the amount of decorrelated audio signals (at Decorrelation (residual) energy suppression 509) is based on the metadata. However in some embodiments the limitation of the amount of the decorrelated audio signals to be present at the spatial output signal (or in other words the suppression of decorrelated audio signals) can be based on signal analysis.

For example the audio signals may be analysed to determine whether the audio signals comprise substantial speech components, or other signal types where decorrelation is known to cause particular reduction of the perceived audio quality. Therefore some embodiments comprise an audio type analyser configured to determine a type of audio signal (for example speech) and this can be used as an input to the decorrelation (residual) energy suppression 509 to enable suppression of the decorrelated (residual) signal. For example, when speech is detected, the amount of the decorrelated sound could suppressed to half. In such a case, the suppression of the decorrelated sound could be additionally also based on the spatial metadata, or without considering the spatial metadata.

In the above embodiments, the suppression of the decorrelated sounds was performed as a separate decorrelation (residual) energy suppression block 509. The block was described to perform the suppression by suppressing the residual covariance matrix. This subsequently causes the decorrelated sound at the spatial output signal to be reduced. It is clear that the suppression could be performed in other ways than suppressing the residual covariance matrix, for example, by suppressing the input signal to the decorrelator 521; suppressing the output signal of the decorrelator 521; or suppressing the residual mixing matrix 512.

Figure 7:
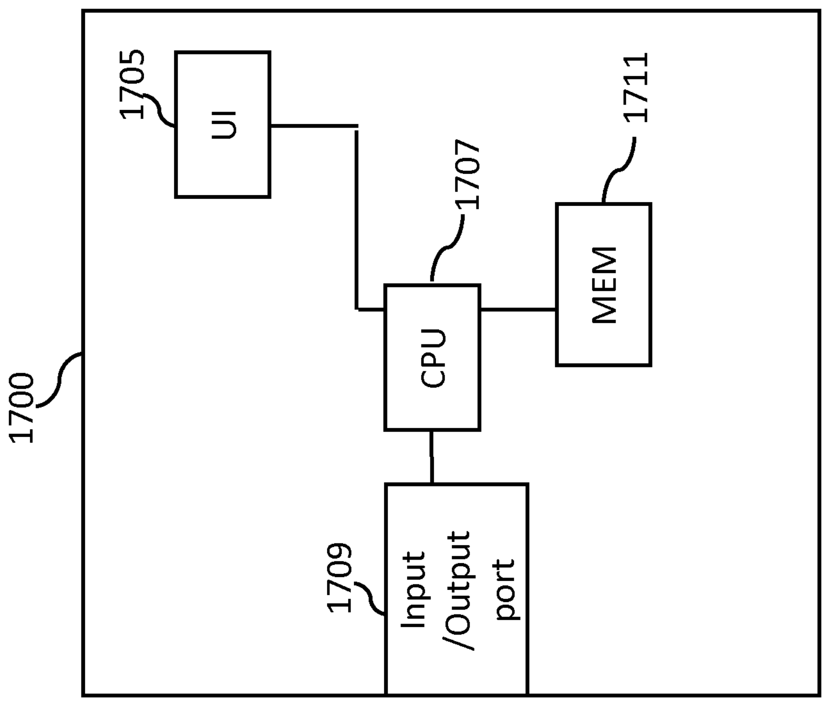
FIG. 7 shows an example device suitable for implementing the apparatus shown in previous figures.

With respect to FIG. 7 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc. The device may for example be configured to implement the encoder/analyser part 101 and/or the decoder/synthesizer part 105 as shown in FIG. 1 or any functional block as described above.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The transceiver input/output port 1709 may be configured to receive the signals.

In some embodiments the device 1700 may be employed as at least part of the synthesis device. The input/output port 1709 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus to:

receive a spatial audio signal, the spatial audio signal comprising at least one audio signal and spatial metadata associated with the at least one audio signal;

generate at least one decorrelated audio signal based on the at least one audio signal;

determine at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata or at least one property determined based on the at least one audio signal; and generate the at least two output audio signals for the spatial audio reproduction based on the spatial audio signal and the at least one decorrelated audio signal, wherein the amount of the at least one decorrelated audio signal within at least two output audio signals is controlled based on the at least one control parameter;

wherein the at least one target further property comprises an audio type or covariance.

2. The apparatus as claimed in claim 1, wherein the at least one control parameter comprises at least one of:

at least one processing gain applied to at least one of the at least one decorrelated audio signal or the at least one audio signal being decorrelated;

at least one mixing matrix configured to control a mixing of the at least one decorrelated audio signal and the at least one audio signal;

at least one mixing matrix and at least one residual mixing matrix, the at least one mixing matrix and the at least one residual mixing matrix configured to control a mixing of the at least one decorrelated audio signal and the at least one audio signal; or at least one covariance matrix configured to control a generation of at least one mixing matrix and/or at least one residual mixing matrix, the at least one mixing matrix and/or the at least one residual mixing matrix configured to control a mixing of the at least one decorrelated audio signal and/or the at least one audio signal.

3. The apparatus as claimed in claim 1, wherein the instructions, when executed with the at least one processor, cause the apparatus to:

determine at least one further property based on the at least one audio signal;

determine the at least one target further property of the at least two output audio signals;

determine at least one first control parameter based on the at least one further property based on the at least one audio signal and the at least one target further property of the at least two output audio signals; and determine at least one second control parameter or modify the at least one first control parameter based on at least one of: the spatial metadata or the at least one property determined based on the at least one audio signal.

4. The apparatus as claimed in claim 3, wherein the instructions, when executed with the at least one processor, cause the apparatus to at least one of:

mix the at least one audio signal and the at least one decorrelated audio signal based on the at least one first control parameter and the at least one second control parameter or the at least one modified first control parameter; or output the at least two output audio signals for the spatial audio reproduction.

5. The apparatus as claimed in claim 3, wherein the determined the at least one second control parameter or the modified at least one first control parameter is based on at least one direct-to-total energy ratio parameter within the spatial metadata.

6. The apparatus as claimed in claim 3, wherein the at least one further property based on the at least one audio signal is a covariance property, and the at least one target further property of the at least two output audio signals is a target covariance property of the at least two output audio signals.

7. The apparatus as claimed in claim 6, wherein the instructions, when executed with the at least one processor, cause the apparatus to at least one of:

determine a residual covariance property based on the covariance property and the target covariance property of the at least two output audio signals; or process the residual covariance property based on the spatial metadata associated with the at least one audio signal.

8. The apparatus as claimed in claim 7, wherein the instructions, when executed with the at least one processor, cause the apparatus to:

attenuate the residual covariance property when the spatial metadata indicates that the at least one audio signal is directional; and pass the residual covariance property unprocessed when the spatial metadata indicates that the at least one audio signal is ambient.

9. The apparatus as claimed in claim 6, wherein the instructions, when executed with the at least one processor, cause the apparatus to:

generate an overall energy estimate based on the covariance property;

determine head related transfer function data based on a direction parameter from the spatial metadata associated with the at least one audio signal; and determine the target covariance property of the at least two output audio signals further based on the head related transfer function data and the overall energy estimate.

10. The apparatus as claimed in claim 1, wherein the determined at least one property is based on the at least one audio signal, the at least one property is the audio type, and the instructions, when executed with the at least one processor, cause the apparatus to:

determine whether the audio type is a determined audio type; and determine the at least one control parameter based on the audio type being the determined audio type.

11. The apparatus as claimed in claim 10, wherein the determined audio type is speech.

12. The apparatus as claimed in claim 1, wherein the at least one audio signal comprises transport audio signals generated with an encoder.

13. A method for an apparatus, the method comprising:

receiving a spatial audio signal, the spatial audio signal comprising at least one audio signal and spatial metadata associated with the at least one audio signal;

generating at least one decorrelated audio signal based on the at least one audio signal;

determining at least one control parameter configured to control an amount of the at least one decorrelated audio signal within at least two output audio signals for spatial audio reproduction, wherein the at least one control parameter is at least based on at least one target further property of the at least two output audio signals and at least one of: the spatial metadata or at least one property determined based on the at least one audio signal; and generating the at least two output audio signals for the spatial audio reproduction based on the spatial audio signal and the at least one decorrelated audio signal, wherein the amount of the at least one decorrelated audio signal within at least two output audio signals is controlled based on the at least one control parameter;

wherein the at least one target further property comprises an audio type or covariance.

14. The method as claimed in claim 13, wherein the at least one control parameter comprises at least one of:

at least one processing gain applied to at least one of the at least one decorrelated audio signal or the at least one audio signal being decorrelated;

at least one mixing matrix configured to control a mixing of the at least one decorrelated audio signal and the at least one audio signal;

at least one mixing matrix and at least one residual mixing matrix, the at least one mixing matrix and the at least one residual mixing matrix configured to control a mixing of the at least one decorrelated audio signal and the at least one audio signal; or at least one covariance matrix configured to control a generation of at least one mixing matrix and/or at least one residual mixing matrix, the at least one mixing matrix and/or the at least one residual mixing matrix configured to control a mixing of the at least one decorrelated audio signal and/or the at least one audio signal.

15. The method as claimed in claim 13, wherein determining the at least one control parameter further comprises:

determining at least one further property based on the at least one audio signal;

determining the at least one target further property of the at least two output audio signals;

determining at least one first control parameter based on the at least one further property based on the at least one audio signal and the at least one target further property of the at least two output audio signals; and determining at least one second control parameter or modify the at least one first control parameter based on at least one of: the spatial metadata or the at least one property determined based on the at least one audio signal.

16. The method as claimed in claim 15, wherein generating the at least two output audio signals for the spatial audio reproduction further comprises:

mixing the at least one audio signal and the at least one decorrelated audio signal based on the at least one first control parameter and the at least one second control parameter or the at least one modified first control parameter; or outputting the at least two output audio signals for the spatial audio reproduction.

17. The method as claimed in any of claim 15, wherein determining the at least one second control parameter or the modified at least one first control parameter is based on at least one direct-to-total energy ratio parameter within the spatial metadata.

18. The method as claimed in claim 15, wherein the at least one further property based on the at least one audio signal is a covariance property, and the at least one target further property of the at least two output audio signals is a target covariance property of the at least two output audio signals.

19. The method as claimed in claim 18, wherein determining the target covariance property of the at least two output audio signals comprises:

generating an overall energy estimate based on the covariance property;

determining head related transfer function data based on a direction parameter from the spatial metadata associated with the at least one audio signal; and determining the target covariance property of the at least two output audio signals further based on the head related transfer function data and the overall energy estimate.

20. The method as claimed in claim 17, wherein determining the at least one second control parameter or modifying the at least one first control parameter comprises at least one of:

determining a residual covariance property based on the covariance property and the target covariance property of the at least two output audio signals; or processing the residual covariance property based on the spatial metadata associated with the at least one audio signal, wherein processing the residual covariance property based on the spatial metadata associated with the at least one audio signal comprises:

attenuating the residual covariance property when the spatial metadata indicates that the at least one audio signal is directional; and passing the residual covariance property unprocessed when the spatial metadata indicates that the at least one audio signal is fully ambient.

* * * * *